(12) United States Patent
Watte et al.

(10) Patent No.: US 7,014,372 B2
(45) Date of Patent: Mar. 21, 2006

(54) METHOD AND APPARATUS FOR SPLICING OPTICAL FIBRES

(75) Inventors: Jan Watte, Grimbergen (BE); Daniel Daems, 's-Gravenwezel (BE); Jacco Elenbaas, Heyningen (NL); Twan Hultermans, Tilburg (NL); Ton Bolhaar, Wadenoyen (NL)

(73) Assignee: Tyco Electronics Raychem NV, Kessel-Lo (BE)

( * ) Notice: Subject to any disclaimer, the term of this patent is extended or adjusted under 35 U.S.C. 154(b) by 42 days.

(21) Appl. No.: 10/490,168

(22) PCT Filed: Sep. 11, 2002

(86) PCT No.: PCT/GB02/04163

§ 371 (c)(1),
(2), (4) Date: Mar. 19, 2004

(87) PCT Pub. No.: WO03/029866

PCT Pub. Date: Apr. 10, 2003

(65) Prior Publication Data

US 2005/0018982 A1    Jan. 27, 2005

(30) Foreign Application Priority Data

Oct. 4, 2001    (GB)    .................................... 0123830

(51) Int. Cl.
*G02B 6/255*    (2006.01)

(52) U.S. Cl. ............................ 385/98; 385/11; 385/52; 385/95; 385/96; 385/97; 385/99

(58) Field of Classification Search .................. 385/11, 385/52, 95–99
See application file for complete search history.

(56) References Cited

U.S. PATENT DOCUMENTS

| 4,229,876 | A | | 10/1980 | Doty ............................ 29/469 |
| 4,687,288 | A | | 8/1987 | Margolin et al. .......... 350/96.2 |
| 4,705,352 | A | | 11/1987 | Margolin et al. .......... 350/96.2 |
| 4,783,137 | A | * | 11/1988 | Kosman et al. ............... 385/53 |

(Continued)

FOREIGN PATENT DOCUMENTS

DE    3701421    7/1988

(Continued)

OTHER PUBLICATIONS

V. Shah et al., "Cleaved oblique fiber and faces for high-performance mechanical splices," OFC, Feb. 20, 1991, p. 111.

(Continued)

*Primary Examiner*—Brian Healy
*Assistant Examiner*—Jerry Martin Blevins
(74) *Attorney, Agent, or Firm*—Myers Bigel Sibley & Sajovec, PA

(57) ABSTRACT

A method of splicing optical fibers includes affixing a first fiber to a first keying element having a particular radial orientation, inserting the keying element in a support which receives the keying element only in a specific radial orientation, cleaving the fiber affixed to the inserted keying element at a predetermined angle (α) relative to the support to form an angled fiber end face, removing the keying element from the support, inserting the keying element into a splicing body which receives the keying element only in a specific radial orientation such that the angled fiber end face has a predictable radial orientation with respect to the splice body, and repeating the above operations for a second fiber and a second keying element, whereby the first angled fiber end face and the second angled fiber end face abut in a substantially parallel orientation.

16 Claims, 3 Drawing Sheets

U.S. PATENT DOCUMENTS

| | | | | |
|---|---|---|---|---|
| 5,384,885 A | | 1/1995 | Diner | 385/140 |
| 5,394,496 A | | 2/1995 | Caldwell et al. | 385/70 |
| 5,469,522 A | | 11/1995 | Fan | 385/98 |
| 5,524,163 A | * | 6/1996 | Kobayashi et al. | 385/96 |
| 5,590,229 A | | 12/1996 | Goldman et al. | 385/59 |
| 5,842,622 A | * | 12/1998 | Mansfield et al. | 225/96.5 |
| 5,943,460 A | * | 8/1999 | Mead et al. | 385/81 |

FOREIGN PATENT DOCUMENTS

| | | |
|---|---|---|
| DE | 196 39 184 | 3/1998 |
| EP | 0 419 699 | 4/1991 |
| EP | 0 476 881 | 3/1992 |
| GB | 2 287 552 | 9/1995 |
| JP | 59038707 | 3/1984 |
| WO | 91/02994 | 3/1991 |
| WO | 98/54608 | 12/1998 |

OTHER PUBLICATIONS

F. Sears, "A Passive Mechanical Splice for Polarization—Maintaining Fibers", Journal of Lightwave Technology, Oct. 1989, No. 10, New York, pp. 1494-1498.

M. Takahashi, "Elastic Polishing Plate Method and Conditions for Forming Angled Convex Surface on Ferrule Endface", Journal of Lightwave Technology, IEEE, vol. 15, No. 9, New York, pp. 1675-1680.

Young et al., "Loss and Reflectance of Standard Cylindrical-Ferrule Single-Mode Connectors Modified by Polishing a 10° Oblique Endface Angle", IEEE Photonics Technology Letters 1, Dec. 1989, No. 12, New York, pp. 461-463.

International Search Report for PCT/GB 02/04163.

Great Britain Search Report for GB 0123830.2.

International Preliminary Examination Report for PCT/GB 02/04163.

* cited by examiner

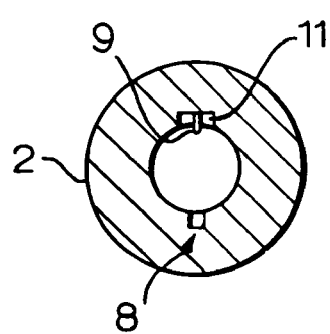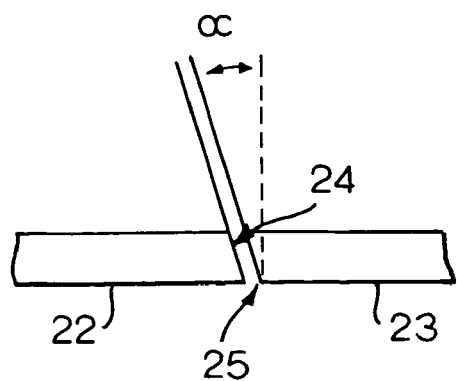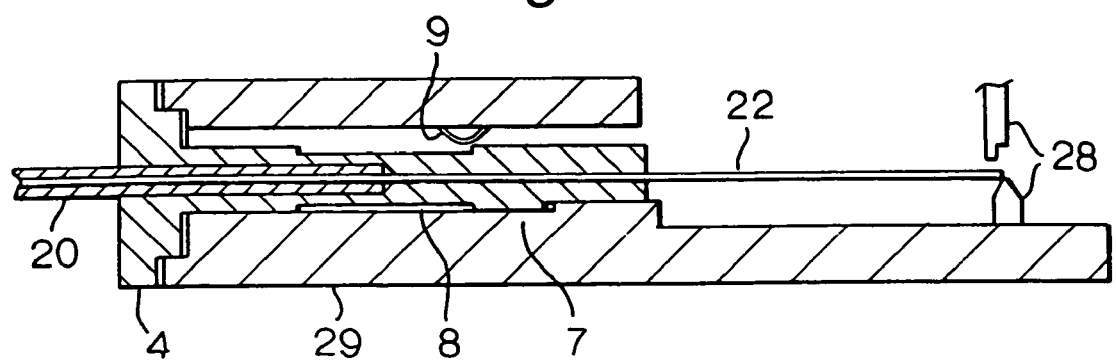

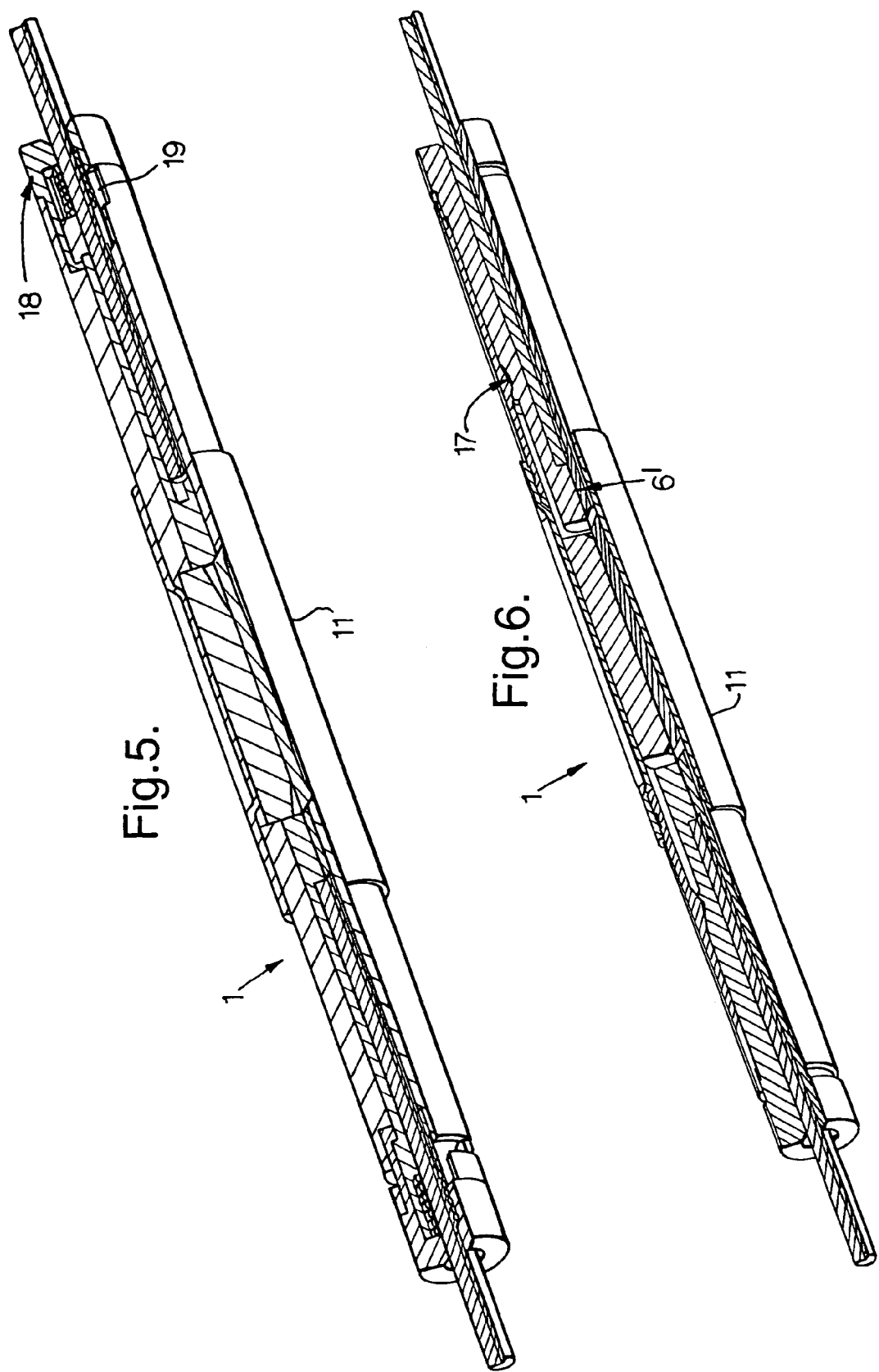

METHOD AND APPARATUS FOR SPLICING OPTICAL FIBRES

RELATED APPLICATIONS

The present application is a National Phase application of PCT/GB02/04163 filed on Sep. 11, 2002 and published in English, which claims priority from Application GB 0123830.2 filed on Oct. 4, 2001.

BACKGROUND OF THE INVENTION

The present invention relates to method and apparatus for splicing optical fibres. More in particular, the present invention relates to a method of splicing optical fibres in which the ends of the fibres are cut at a non-perpendicular angle.

Optical fibres can be interconnected or "spliced" in several ways. Fusion splicing involves heating the ends of the fibres to be spliced in order to produce a continuous transition. Mechanical splicing involves abutting the fibre ends in a suitable support or "splice". As mechanical splicing does not require any heating, it is often preferred for splicing in the field. The mechanical splice device needs to be carefully designed to achieve a proper alignment of the fibre ends. Examples of such splice devices are disclosed in U.S. Pat. Nos. 4,687,288 and 5,394,496. A special type of releasable mechanical fibre splice is a fibre optic connector. An example of such a connector is disclosed in U.S. Pat. No. 4,705,352.

It is well known to cut optical fibres at a predetermined angle to produce a suitable fibre end face for splicing and/or connecting. U.S. Pat. No. 4,229,876, for example, discloses an optical fibre cleaver or "breaker" which can be used for this purpose.

Traditionally fibres have been cleaved under a right angle, resulting in a fibre end face which is perpendicular to the longitudinal axis of the fibre. It has been found, however, that reflection losses can be significantly reduced by cleaving the fibres at a non-perpendicular angle, that is, at an angle which deviates from the perpendicular. International Patent Application WO 98/54608, for example, discloses a tool for angled cleaving of optical fibres. The fibres are cleaved with ends which are consistently angled at between 1° and 20°, preferably 5° to 10°, away from the perpendicular to the fibre axis.

Although fibres having such an angled end face potentially perform very well, a problem arises when they are to be spliced. For the angled end faces to abut properly, leaving virtually no gap, the end faces have to be parallel. This requires the fibres to have a very specific keyed orientation when they are accommodated in a splice body. In existing splicing methods, the relative orientation of the fibres is arbitrary. Of course it is possible to experimentally determine the proper orientation of the fibres by accommodating them in a splice and then measuring the reflection losses at various orientations. This is, however, both expensive and time consuming and may cause the fibre end faces to be damaged. Alternatively optical gel (index matching gel) may be used to reduce the adverse effects of an improper relative orientation of the fibre end faces but it has been found that the advantageous effects of the angled cleaving may still be lost.

SUMMARY OF THE INVENTION

It is therefore an object of the present invention to overcome the above-mentioned and other disadvantages of the Prior Art and to provide a method of splicing optical fibres which fully utilises the advantages of angled cleaving.

It is a further object of the present invention to provide a method of splicing optical fibres which is both practical and economical.

It is another object of the present invention to provide apparatus for implementing the inventive method.

Accordingly, the present invention provides a method of splicing optical fibres, the method comprising the steps of affixing a first fibre to a first keying element having a particular radial orientation, inserting the keying element in a support which receives the keying element only in a specific radial orientation, cleaving the fibre affixed to the inserted keying element at a predetermined angle ($\alpha$) relative to the support to form an angled fibre end face, removing the keying element from the support, inserting the keying element into a splicing body which receives the keying element only in a specific radial orientation such that the angled fibre end face has a predictable radial orientation with respect to the splice body, and repeating the above steps for a second fibre and a second keying element, whereby the first angled fibre end face and the second angled fibre end face abut in a substantially parallel orientation.

By cleaving the fibres at a specific radial orientation and accommodating them again at a specific radial orientation, a predictable relative orientation of the abutting fibres is achieved. In this way, a substantially perfect parallel abutment of the fibre end faces can be achieved.

It should be pointed out that the said specific radial orientation when cleaving need not be identical to the one when accommodating in the splice body. On the contrary, when the same cleaving device and associated support orientation is issued, the orientation of the second keying element when the fibre ends are abutting will generally be 180° rotated relative to that of the first keying element (assuming the keying elements are identical and use the same support when cleaving).

It is noted that the fibre optic connector disclosed in the above-mentioned U.S. Pat. No. 4,705,352 has a keying mechanism to ensure that upon repeated couplings the fibre connector is always connected in the same relative position to prevent scarring of the end of the fibre. There is no suggestion to use such a keying mechanism for angled cleaving. On the contrary, said U.S. patent suggests that the fibre could be spliced at any relative orientation.

In the method of the present invention, the support in which the key elements are received when the fibres are being cleaved is preferably attached to the cleaving device so as not to allow any movement of the support relative to the cleaving device. Advantageously, the support may be integral with the cleaving device.

Preferably, the angle ($\alpha$) at which the fibres are cleaved is between 5° and 12° relative to a line normal to the longitudinal axis of each fibre. (It is noted that the said angle is always measured relative to a line perpendicular to the longitudinal axis of the fibre; an angle of 0° therefore implies a perpendicular end face). In preferred embodiments an angle of 7° to 9° is used, although other angles may also be used.

In a particularly preferred embodiment, the step of affixing a fibre to a keying element involves shrinking a heat-recoverable sleeve around the keying member. The keying elements may each consist of two parts which are clamped together by the heat-recoverable sleeve. In this way, a secure clamping of the fibres may be achieved which may assist in providing axial strain relief In an alternative embodiment, the step of affixing a fibre to a keying element involves crimping the keying element. Also in this embodiment axial strain relief may be provided by the keying elements.

Advantageously, the abutting angled fibre end faces are accommodated in an alignment member. Such an alignment member, which is known per se, provides a lateral alignment of the ends of the fibres. Preferably, the alignment member comprises a first element and a second element between which fibres may be accommodated, at least one element being provided with a substantially V-shaped groove which is covered when the elements are brought together.

The present invention further provides a kit-of-parts for carrying out the method as described, the kit comprising a fibre cleaving device having an associated support which receives a keying element only in a specific radial orientation, and a fibre splicing device having a body which receives the keying element only in a specific radial orientation. In addition, the present invention provides a fibre cleaving device and a fibre cleaving device for use in said kit-of-parts.

BRIEF DESCRIPTION OF THE DRAWINGS

The present invention will be described below with reference to exemplary embodiments illustrated in the accompanying drawings, in which:

FIG. 2 schematically shows, the embodiment of FIG. 1 in a transverse cross-sectional view.

FIG. 3 schematically shows, in side view, a cleaving arrangement of the present invention.

FIG. 4 schematically shows, in side view, optical fibres spliced according to the present invention.

FIG. 5 schematically shows, in perspective, an alternative embodiment of a splice according to the present invention.

FIG. 6 schematically shows, in perspective, a further alternative embodiment of a splice according to the present invention.

DETAILED DESCRIPTION OF EMBODIMENTS OF THE INVENTION

Figure 1:
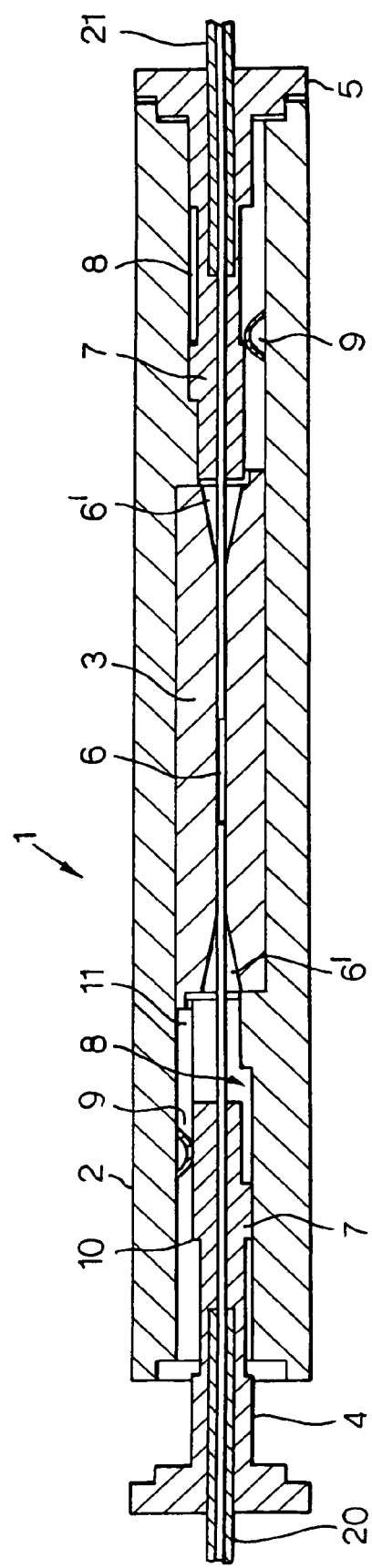
FIG. 1 schematically shows a first embodiment of a splice according to the present invention in a longitudinal cross-sectional view.

The mechanical splice 1 shown merely by way of non-limiting example in FIG. 1 comprises a substantially tubular body 2, an alignment member 3 and two keying elements 4 and 5. Optical fibres 20, 21 are accommodated in the keying elements 4, 5 respectively. As shown in FIG. 1, the cladding has been removed from the end portions of the fibres. The fibre ends meet in the alignment member 3 which is provided with a V-shaped groove 6 for accommodating and aligning the fibre ends. The groove has widened sections 6' at the ends of the alignment member 3 which allow the fibres to buckle in those areas so as to maintain a compressive force on the abutting fibre end faces.

In accordance with the present invention, the splicing device 1 is provided with a mechanism for defining and maintaining the angular orientation of the optical fibres. This mechanism comprises keying ridges or protrusions 7 provided on the keying elements 4, 5, which protrusions can be accommodated in keying slots 8 provided in the body 2. The combination of the protrusions 7 and the slots 8 ensures that the keying elements 4, 5 can be inserted into the body 2 in one particular angular orientation only (see also FIG. 2). It will be understood that the fibres 20, 21 are firmly and immovably held in the keying elements 4, 5, for example by crimping the keying elements onto the fibres.

Once inserted in the body 2, the keying elements of the embodiment shown in FIG. 1 are held by resilient latches which latch behind ridges 10 of the keying elements. The latches 9 may be made of metal (e.g. metal wire) or plastic and are accommodated in slots 11. The fibre ends are accommodated in the keying elements such that when the keying elements are latched, the fibre ends abut and at least one of the fibres is caused to buckle slightly in one of the widened groove portions 6'. This ensures a good contact between the fibre end faces.

As can be seen in FIG. 1, the arrangement of the second keying element 5 is 180° rotated relative to the first keying element 4. This arrangement serves to use a single keying element design for both sides of the device 1 but also, and more importantly, to ensure the correct angular orientation of the fibre end faces. This will now be further explained with reference to FIG. 4.

The keying element 4 (also shown in FIG. 1) is attached to a fibre 20 which has an end portion 22 from which the cladding has been removed. The key element 4 is then inserted into the support 29. Due to the slot 8 and the protrusion 7, the key element 4 can only be inserted in one particular angular orientation. The fibre end is then cleaved under an angle using cleaving means 28 which are known per se, for example from International Patent Application in WO 98/54608. The resulting angle fibre end face 24 is schematically depicted in FIG. 3, where the angle u has been exaggerated for the sake of clarity.

Returning to FIG. 4, the keying element 4 is then removed from the support 29 and may be inserted into a splice body 2. (It is noted that splice bodies may be factory installed with one fibre, but it is of course also possible to insert both fibres in the field). The protrusion 7 and slot 8 of the splice body 2 ensure that the key element 4 is inserted in a predetermined orientation, in the example shown in exactly the same orientation as when being cleaved.

The above process is repeated for key element 5 holding fibre 21. As shown in FIG. 1, key element 5 is inserted in the splice body 2 rotated 180° relative to the key element 4, resulting in the fibre end faces 24 and 25 being parallel, as shown in FIG. 3. When both key elements are latched, the end faces 24, 25 will be abutting, resulting in an excellent splice having very low reflection loss.

In the embodiment of FIG. 5 springs 19 are accommodated between the key elements and key element holders 18 to provide a bias pressure ensuring a good contact of the fibre end faces.

In the embodiment of FIG. 6 no key element holders are provided. Instead the key elements are provided with a "snap-fit" mechanism 17 as commonly used for the caps of ball point pens and the like. Of course various other embodiments could be envisaged in which the advantages of angled cleaving in accordance with the present invention are obtained.

It will therefore be understood by those skilled in the art that the present invention is not limited to the embodiments shown and that many additions and modifications are possible without departing from the scope of the present invention as defined in the appending claims.

What is claimed is:

1. A method of splicing optical fibres, the method comprising:

affixing a first fibre to a first keying element having a particular radial orientation, inserting the first keying element in a support which receives the first keying element only in a specific radial orientation, cleaving the fibre affixed to the inserted first keying element at a predetermined angle (α) relative to the support to form an angled fibre end face, removing the first keying element from the support, inserting the first keying element into a splicing body which receives the keying element only in a specific radial orientation such that the angled fibre end face has a predictable radial orientation with respect to the splice body, and repeating affixing, inserting, cleaving, removing and inserting for a second fibre and a second keying element, whereby the first angled fibre end face and the second angled fibre end face abut in a substantially parallel orientation.

2. A method according to claim 1, wherein the angle (α) at which the fibres are cleaved is between about 5° and about 12° relative to a line normal to the longitudinal axis of each fibre.

3. A method according to claim 1, wherein affixing a fibre to a keying element includes shrinking a heat-recoverable sleeve around the keying element.

4. A method according to claim 1, wherein affixing a fibre to a keying element-includes crimping the keying element.

5. A method according to claim 1, wherein the abutting angled fibre end faces are accommodated in an alignment member.

6. A method according to claim 5, wherein the alignment member comprises a first element and a second element between which fibres may be accommodated, at least one alignment member element being provided with a substantially V-shaped groove which is covered when the elements are brought together.

7. A method according to claim 1, wherein the splicing body is configured to receive a connector.

8. A method according to claim 1, wherein the first keying element is inserted into the splicing body during manufacture.

9. A method according to claim 1, wherein the splicing body is provided with at least one latch that latches a keying element.

10. A method according to claim 1, wherein optical gel is applied onto the second fibre end face.

11. A kit-of-parts for carrying out the method of claim 1, the kit-of-parts comprising:
   a fibre cleaving device having an associated support which receives a keying element only in a specific radial orientation, and
   a fibre splicing device having a body which receives the keying element only in a specific radial orientation.

12. A fibre cleaving device having an associated support which receives a keying element only in a specific radial orientation for carrying out the method of claim 1.

13. A fibre cleaving device according to claim 12, wherein the support is fixedly attached to the device.

14. A fibre splicing device having a body which receives the keying element only in a specific radial orientation for carrying out the method of claim 1.

15. The method of claim 1, wherein the first keying element and the second keying element each include a protrusion on an outer face thereof and wherein the support includes a slot therein configured to receive the protrusion of a keying element inserted therein to provide the specific radial orientation and wherein the splicing body includes a slot therein in a first end that receives the protrusion of the first keying element and a slot therein in a second end that receives the protrusion of the second keying element, the slot in the second end of the splicing body being rotated about 180 degrees relative to the slot in the first end of the splicing body to align the respective angled fibre end faces in the substantially parallel relationship.

16. The method of claim 15, wherein the first keying element and/or the second keying element include a latching ridge thereon and wherein the corresponding first and/or second end of the splicing body include a latch that engages the latching ridge of a keying element inserted therein to provide a compressive force on the abutting fibre end faces.

* * * * *